(No Model.)
F. MADLENER
APPARATUS FOR TREATING WHISKY.
No. 444,152. Patented Jan. 6, 1891.
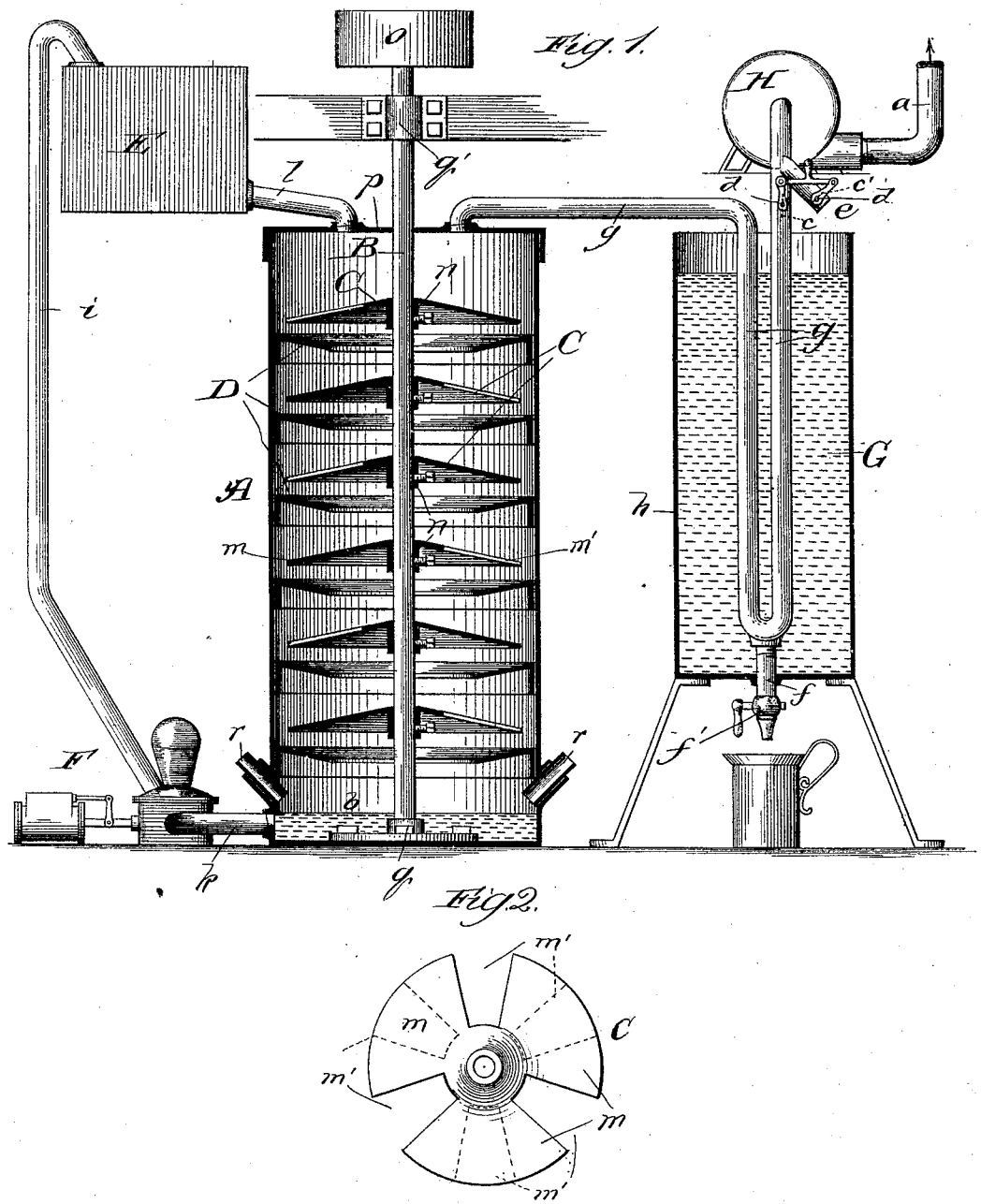

United States Patent Office.

FRIDOLIN MADLENER, OF CHICAGO, ILLINOIS.

APPARATUS FOR TREATING WHISKY.

SPECIFICATION forming part of Letters Patent No. 444,152, dated January 6, 1891.

Application filed June 11, 1890. Serial No. 355,081. (No model.)

*To all whom it may concern:*

Be it known that I, FRIDOLIN MADLENER, a citizen of the United States, residing at Chicago, in the county of Cook and State of Illinois, have invented a new and useful Improvement in Apparatus for Treating Whisky, of which the following is a specification.

The object of my invention is to provide an apparatus for the treatment of young whisky, which will afford to it the attributes of age by purifying it much more rapidly than by waiting for age to accomplish that purpose.

In the accompanying drawings, Figure 1 is a view in elevation, partly sectional, of my improved apparatus; and Fig. 2, a plan view of a detail, showing a modified form thereof.

A is a tank, which, from the nature of its function and that of the mechanism immediately connected with it, I term a "vaporizing-tank." It should be closed on all sides, except as to air-inlet ducts $r$, provided in any desired number near its base, and which should incline upward to a height beyond that at which the liquid contents may rise inside the tank.

B is a rotary spindle, supported in a suitable bearing $q$ in the tank and extending through the cover $p$, beyond which it should be supported in a bearing $q'$, and is adapted to be geared to the power for rotating it, as by the provision of a belt-pulley $o$. At intervals inside the tank A the spindle B carries heads C, the most suitable form of each of which is that of a disk slanting downward toward its perimeter from the center, where it should be formed with a hub $n$, at which to secure it to the spindle. I find that the best results are attained with my apparatus by forming the heads C, as represented in Fig. 2, in sectors $m$ around the center, whereby the intervening spaces $m'$ are produced, and by so adjusting the heads on the spindle as to cause the spaces $m'$ in the series of heads to be out of coincidence with each other.

On the inner wall of the stationary tank A, I provide rigid annular flanges or shelves D, alternating with the heads and extending inward beyond their perimeters, and thus between adjacent pairs of the heads. The shelves D should slant slightly, as shown, toward the center of the tank, thus contrary to the slant of the heads.

E is the supply-tank, which is preferably located on a higher level than the top of the tank A, whereby its contents may enter, by gravity, the vaporizing-tank through a suitable spout $l$, leading through the cover $p$. A suitable force-pump F communicates through its suction-pipe $k$ with the interior of the tank A below the series of heads C therein, and communicates with the supply-tank E through a conduit $i$.

G is a condenser, comprising a suitably-supported tank $h$, to contain the cooling medium, (cold water,) and into which dips a pipe $g$, (which may be a worm,) leading from the upper end of the vaporizing-tank to a suction-fan H or other draft-producing means. At the lowest point of the pipe $g$ inside the condenser it should be tapped by a branch $f$, extending outside the condenser-tank, and there provided with a draw-off cock $f'$, through which any of the valuable liquid intercepted by condensation may be withdrawn and saved.

It is desirable to provide the pipe $g$ near the fan H with a Y branch $e$, whereby ordinary damper-shaped valves $c'$ and $c$, (indicated by dotted lines,) respectively, in the branch $e$ and pipe $g$ may be linked together from their journal ends $d$ $d$, as represented in Fig. 1, and the degree of draft by the fan through the pipe $g$ regulated by adjusting the valve $c$ to fully open the passage it controls, and thereby close the valve $c'$ to obstruct the passage through the branch $e$, or to partially close the valve $c$, and simultaneously effect partial opening of the valve $c'$. Thus, while the capacity of the fan may be proportionate to the draft capacity of the pipe $g$ when entirely open, by closing it, as described, the fan is still supplied to its full capacity with the aid of the branch $e$, thereby avoiding any necessity for regulating the fan in case of regulation of the passage $g$.

The operation is as follows: The supply-tank E is provided with the desired quantity of young whisky to be treated, and the spindle B is rotated at the proper speed. As the contents of the tank E flow through the spout $l$ into the tank A they strike the first revolving head C, which by the consequent centrifugal action on the liquid breaks up and sets free the oil and other globules and spreads and splashes the liquid against the wall of the vaporizing-tank, whence it falls on the adjacent stationary shelf D, and flows thence to the next lower head C, from which the same action takes place as that described, and it is so continued till the liquid reaches the space $b$ below the series of heads and shelves. If the heads C are provided with the radial spaces $m'$, the liquid may more readily, or in larger quantities at a time, gain access to the bottom compartment $b$, and is thoroughly stirred and subdivided by the impingement against it of the edges of the openings $m'$ in passing through the latter. While the proceeding thus described is progressing the fan H is in motion, creating a desirably strong suction of air into the tank A through the opening or openings $r$ and its rise in the tank thus in opposition to the falling whisky, whereby it vaporizes and takes up impurities in the liquid, and is drawn, charged with the impure matter it has been able so to take up, through the pipe $g$ and discharged through the fan out of its discharge-pipe $a$. Any of the valuable portion of the whisky that may have been taken up by the air-currents will be condensed in passing through the condenser G and accumulate in the trap $f$, whence it may be withdrawn from time to time and saved. As the liquid reaches the space $b$ in the bottom of the vaporizing-tank A it is pumped by the action of the force-pump F back into the reservoir E. The action of the mechanism, as described, should be continued until the contents of the supply-tank E have been subjected to the vaporizing action in the tank A sufficiently to purify, and thus age it to the desired degree, thereby subjecting the supply over and over again circuitously to the action in the vaporizing-tank. It is found that by continuing the operation for from two to three days the effect on the whisky is the same as by allowing it to age by storing it for about two years.

What I claim as new, and desire to secure by Letters Patent, is—

1. In an apparatus for purifying whisky, the combination of a vaporizing-tank A, containing stationary shelves D, and a rotary spindle B, carrying heads C, alternating with and overlapping the shelves, a desired number of air-inlets $r$ near the base of the tank, inclining upward outside the tank to a height beyond that at which the liquid may rise therein, a supply-reservoir E, communicating with the vaporizing-tank, a force-pump F, interposed in the said communication, and a draft-producing means, such as a fan H, communicating with the vaporizing-tank near its upper end, substantially as described.

2. In an apparatus for purifying whisky, the combination of a vaporizing-tank A, containing inwardly-slanting shelves D, rigidly secured at intervals to its wall, and a rotary spindle B, carrying outwardly-slanting disk-shaped heads C, formed with sectors $m$, affording intervening spaces $m'$ and alternating with and overlapping the said shelves, a desired number of air-inlets $r$ near the base of the tank, a supply-reservoir E, communicating with the vaporizing-tank, a force-pump F, interposed in the said communication, and draft-producing means, such as a fan H, communicating with the vaporizing-tank near its upper end, substantially as described.

3. An apparatus for purifying whisky, comprising, in combination, a vaporizing-tank A, containing inwardly-slanting shelves D, rigidly secured at intervals to its wall, and a rotary spindle B, carrying outwardly-slanting disk-shaped heads C, alternating with and overlapping the said shelves, a desired number of air-inlets $r$ near the base of the tank, a supply-reservoir E, communicating with the vaporizing-tank through a conduit $i$, a force-pump F, interposed in the conduit between the vaporizing-tank and reservoir E, a condenser G, a fan H, a conduit $g$, connecting the fan with the upper portion of the vaporizing-tank and leading through the condenser, a trap $f$ in the conduit $g$ in the condenser, a branch $e$ on the said conduit $g$, and valves $c$ and $c'$, respectively inside the conduit and its branch and linked together, the whole being constructed and arranged to operate substantially as described.

FRIDOLIN MADLENER.

Witnesses:
DOUGLAS DYRENFORTH,
BRUCE L. ELLIOTT.